(12) United States Patent
Endo

(10) Patent No.: US 7,831,659 B2
(45) Date of Patent: Nov. 9, 2010

(54) DATA PROVIDING SYSTEM, SERVER AND PROGRAM

(76) Inventor: Hiroyuki Endo, Lions Hills Takamine 5-108, 106-2 Yagotofujimi, Showa-ku, Nagoya-shi, Aichi (JP) 466-0812

( * ) Notice: Subject to any disclaimer, the term of this patent is extended or adjusted under 35 U.S.C. 154(b) by 216 days.

(21) Appl. No.: 12/279,908

(22) PCT Filed: Feb. 22, 2007

(86) PCT No.: PCT/JP2007/053302

§ 371 (c)(1),
(2), (4) Date: Aug. 19, 2008

(87) PCT Pub. No.: WO2007/097401

PCT Pub. Date: Aug. 30, 2007

(65) Prior Publication Data

US 2009/0006579 A1    Jan. 1, 2009

(30) Foreign Application Priority Data

Feb. 22, 2006    (JP) .............................. 2006-045195

(51) Int. Cl.
*G06F 15/16*    (2006.01)
(52) U.S. Cl. ........................ 709/203; 709/216; 709/217; 709/245; 358/1.16; 707/661; 707/736; 707/822; 707/828; 725/115; 725/145
(58) Field of Classification Search ................ 709/203, 709/216, 217, 245; 358/1.16; 707/661, 736, 707/822, 828; 725/115, 145
See application file for complete search history.

(56) References Cited

U.S. PATENT DOCUMENTS

| 6,430,311 | B1 * | 8/2002 | Kumada ...................... 382/162 |
| 7,356,160 | B2 * | 4/2008 | Shibaki et al. .............. 382/100 |
| 2001/0009454 | A1 | 7/2001 | Manico et al. |
| 2004/0201738 | A1 | 10/2004 | Moores, Jr. et al. |
| 2005/0219375 | A1 | 10/2005 | Hasegawa |

FOREIGN PATENT DOCUMENTS

| EP | 1 262 247 A1 | 2/2001 |
| JP | 10283446 | 10/1998 |
| JP | 2001318936 | 11/2001 |
| JP | 2002-029602 | 1/2002 |
| JP | 2002-215767 | 8/2002 |
| JP | 2004-070739 | 3/2004 |
| JP | 2004252551 A | 9/2004 |
| JP | 2005293020 | 10/2005 |
| JP | 2006-031135 | 2/2006 |
| JP | 2006344120 A | 12/2006 |

OTHER PUBLICATIONS

Notice of Reason(s) for Rejection dated Feb. 3, 2009 with respect to Japanese Patent Application No. 2006-04195 and a partial English translation thereof.

* cited by examiner

*Primary Examiner*—Michael Won
(74) *Attorney, Agent, or Firm*—Davis & Bujold, P.L.L.C.

(57) ABSTRACT

A data providing system of the present invention is provided with an image acquiring device, an area extracting device, a data storing device, and a data providing device. For each image data acquired by the image acquiring device, a storage destination specifying area is extracted by the area extracting device, storage destination is specified by a storage destination specifying device, and the image data is stored at the storage destination by the data storing device.

13 Claims, 11 Drawing Sheets

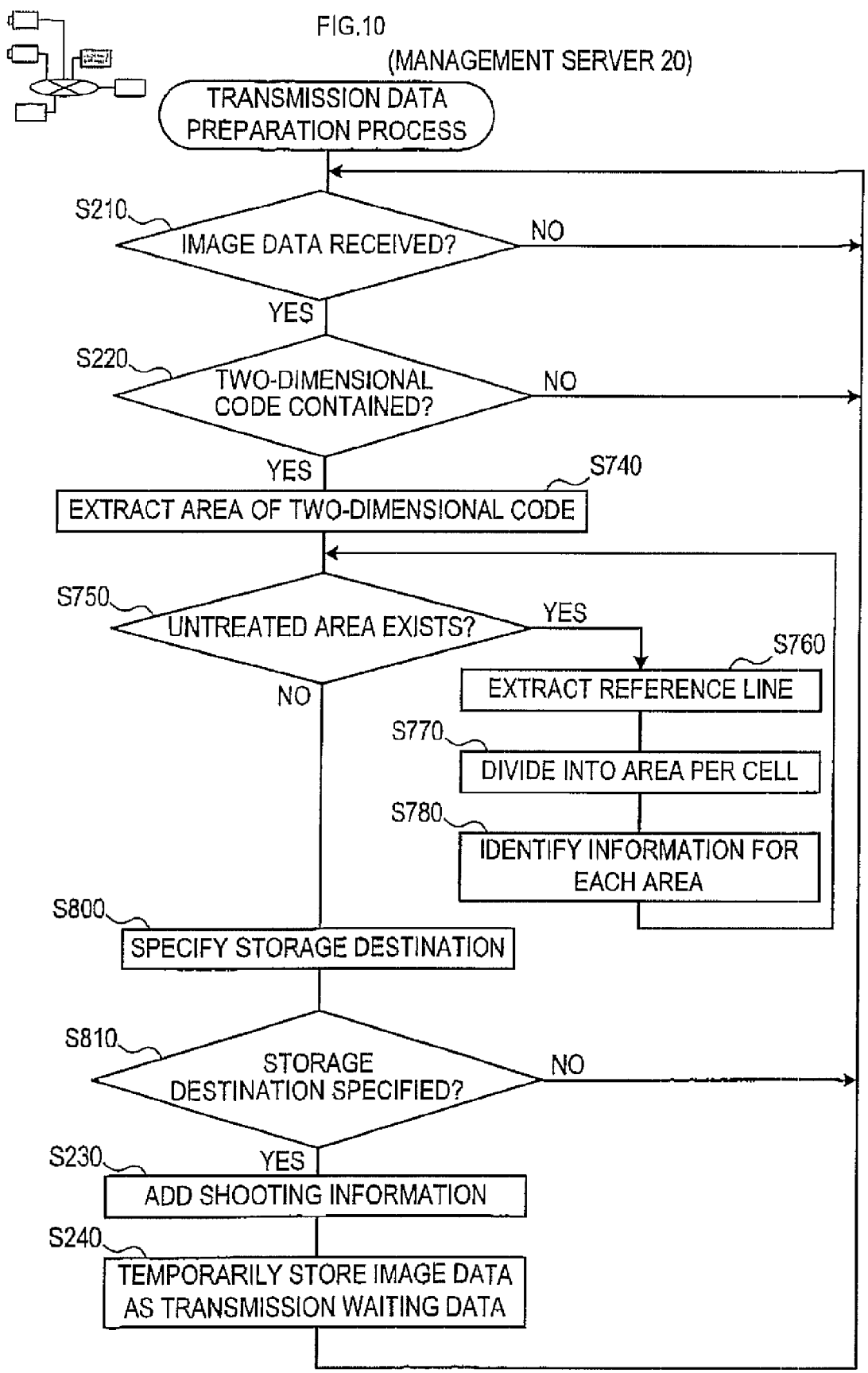

DATA PROVIDING SYSTEM, SERVER AND PROGRAM

TECHNICAL FIELD

This invention relates to a data providing system that provides collected image data.

BACKGROUND ART

Heretofore, whether or not loads in distribution or wastes in waste disposal (hereinafter, referred to as "loads or the like") have reached the destination along an appropriate path has been grasped by the producer side or the waste generator side in the following manner. That is, a sheet of paper such as a slip adhered to the loads or the like is checked (for example, stamped, added with time, and so on) at a transit point in the path to prove that the loads or the like have passed the transit point. Then, the producer side or the waste generator side confirms the sheet of paper.

The present invention concerns a technique which has never existed. Therefore, there is no prior art document to be disclosed.

DISCLOSURE OF THE INVENTION

Problems to be Solved by the Invention

However, in the above-mentioned manner, confirmation that the loads or the like have reached the destination along an appropriate path is made only through the check on the sheet of paper. Therefore, it has to be said that reliability of such confirmation is significantly low.

An object of the present invention, which was made in view of the above problem, is to provide a technique which permits confirmation that the loads or the like have reached the destination along an appropriate path, with higher reliability than before.

Means to Solve the Problems

A data providing system of a first aspect which was made to solve the above problem includes: an image acquiring device, an area extracting device, a storage destination specifying device, a data storing device, and a data providing device. The image acquiring device acquires image data representing a predetermined image. The area extracting device extracts a storage destination specifying area which is an image area contained in the image represented by the image data and which indicates information for specifying a storage destination of the image data, based on the image data acquired by the image acquiring device. The storage destination specifying device specifies the storage destination of the image data acquired by the image acquiring device, based on the storage destination specifying area extracted by the area extracting device. The data storing device stores the image data acquired by the image acquiring device in the storage destination specified by the storage destination specifying device. The data providing device, upon receipt of a request for the image data stored in the specified storage destination by the data storing device from a client terminal capable of communicating data via a network, provides to the client terminal the image data respectively stored in the specified storage destination. For each image data acquired by the image acquiring device, a storage destination specifying area is extracted by the area extracting device, a storage destination is specified by a storage destination specifying device, and the image data is stored at the storage destination by the data storing device.

According to the data providing system adapted as such, the storage destination specifying area is extracted from the image represented by the image data acquired by the image acquiring device, and the image data is stored at the storage destination specified by the storage destination specifying area. In this manner, after stored at the storage destination specified by the storage destination specifying area of the image represented by the image data, the acquired image data can be provided to the client terminal upon request.

Accordingly, if the storage destination specifying area is attached to loads in distribution or wastes in waste disposal (hereinafter, referred to as "loads or the like") and the aforementioned adaptation is assumed to acquire an image in a path which the loads or the like pass through, the image data can be obtained which represents the image of the loads or the like. In addition, the image also includes not only an image area of the loads or the like but an image area of a background of the loads or the like. Therefore, the image can be said to permit visual confirmation of the places which the loads or the like have passed through from these image areas.

That is, the producer or the waste generator can request from the present data providing system the image data at the storage destination specified by the storage destination specifying area attached to the loads or the like of its own through the client terminal, thereby to visually confirm whether the loads or the like of its own have reached the destinations along an appropriate path based on the image data provided upon request.

Since visual confirmation through images is available as such, whether or not the loads or the like have reached the destination along an appropriate path can be confirmed with high reliability, as compared to the conventional manner of confirmation through checking items on a sheet of paper.

The aforementioned image acquiring device is a device that acquires or collects image data. For example, the image acquiring device may be adapted to acquire image data via a camera or the like which can communicate data with the present data providing system.

The aforementioned storage destination specifying device is a device that specifies a storage destination of image data from information indicated in the storage destination specifying area. For example, in case that a two-dimensional code is indicated as the storage destination specifying area, the storage destination specifying device may be adapted to specify information identified by the two-dimensional code as a storage destination of image data.

The data storing device is a device that stores image data at the storage destination specified by the storage destination specifying device. For example, if a storage area of a storage unit of the present data providing system is assumed as a plurality of storage destinations, the data storing device may be adapted to store (memorize) image data at one of the storage destinations. If a storage area of a storage unit of other apparatus which can communicate data with the present data providing system is assumed as a plurality of storage destinations, the data storing device may be adapted to select one of the storage destinations and transmit image data to be stored at the selected storage destination.

The aforementioned area extracting device is a device that extracts a storage destination specifying area from an image represented by image data. No specific restriction is imposed on how to extract the area. For example, in case that the storage destination specifying area has characteristics, the aforementioned data providing system may be further adapted as in a second aspect.

In the data providing system of the second aspect, the area extracting device, in case that the image represented by the image data acquired by the image acquiring device contains an image area having predetermined characteristics as characteristics to be possessed by the storage destination specifying area, extracts the image area as the storage destination specifying area.

Adapted as such, the storage destination specifying area can be extracted from the image acquired by the image acquiring device based on the characteristics as the storage destination specifying area.

The aforementioned data providing device is a device that provides the image data stored by the data storing device upon request from the client terminal. The data providing device may be adapted such that provision of image data can be selectively requested from the client terminal after a specified storage destination is selected.

However, the above adaptation also permits a third party other than the producer or the waste generator to confirm whether the loads or the like have reached the destination along an appropriate path. Therefore, if the producer or the waste generator does not wish such a situation, it is desirable to take some measures.

For example, a different storage destination may be preassociated with each of the client terminals or each of the users of the client terminals. Thereafter, the aforementioned data providing system may be adapted as in a third aspect.

In the data providing system of the third aspect, the data providing device, when receiving identification information which permits identification of the client terminal or a user of the client terminal from the client terminal as a request for the image data, provides to the client terminal the respective image data stored at the storage destination associated with the client terminal or the user of the client terminal identified by the identification information.

In the above adaptation, the user has to request image data together with identification information which permits identification of the client terminal or of the user itself. Moreover, only the image data stored at the storage destination associated with the client terminal or the user identified by the identification information can be provided.

As a result, a third party who does not know identification information of a specific client terminal or of the user cannot make a request together with appropriate identification information. Therefore, confirmation on whether the loads or the like have reached the destination along an appropriate path by a third party other than the producer or the waste generator can be effectively inhibited.

The aforementioned image acquiring device may acquire image data representing an image of a specific single place. Or, the image acquiring device may collect respective image data representing images of a plurality of places.

In order to acquire image data representing images of a plurality of places, for example, the image acquiring device may be adapted to collect image data which a camera capable of communicating data with the present data providing system acquires while changing its shooting area, or may be adapted to collect image data which a plurality of cameras respectively acquire in different shooting areas.

In the case of the above adaptation, it is preferable that acquisition sources of each image data may be set such that images at a plurality of transit points which the loads or the like pass through until reaching the destination can be shot (for example, by disposing respective cameras at the plurality of transit points or by sequentially changing the shooting area of a camera). In this manner, whether or not the loads or the like have passed each of the plurality of transit points can be confirmed based on image data.

If the acquisition sources are set as above, it is desirable to be able to provide image data in a state capable of specifying which image data is the image data at which place.

For this purpose, the aforementioned data providing system may be adapted as in a fourth aspect.

In the data providing system of the fourth aspect, the data acquiring device is capable of acquiring image data representing images at different places. The image data storing device stores the image data acquired by the image acquiring device at the storage destination specified by the storage destination specifying device together with place information which corresponds to information concerning a place of the image represented by the image data. The data providing device, when a request for the image data stored at the specified storage destination is received from the client terminal, provides to the client terminal the image data stored at the specified storage destination in a state capable of specifying the place information stored together with the image data.

In this manner, the image data can be provided in a state capable of specifying the place information concerning the place of the image represented by the image data. Accordingly, the user of the client terminal (the producer or the waste generator) can not only visually confirm whether the loads or the like of its own have reached the destination along an appropriate path based on the image data, but also confirm the place of the image represented by the image data based on the place information specified by the image data.

In the above adaptation, the data providing device may only provide the image data in a state that permits specification of the place information. No specific restriction is imposed on particular embodiments. For example, image data itself in a state capable of specifying the place information may be transmitted to the client terminal. Also, images represented by image data may be provided as a list displayed on a web page in a state capable of specifying the place information.

In the latter case, it is preferable to display respective images as a list in an order determined based on the place information, such that places indicated by the place information may be displayed in order or reverse order of passing of each transit point until the loads or the like reach the destination, for example. This is because such a manner of display permits the user to grasp relationship of each image.

For this purpose, the present data providing system may be adapted as in a fifth aspect, for example.

The data providing system of the fifth aspect includes a page generating device that generates a web page which displays a list of images represented by the image data stored at the storage destination, per storage destination at which the image data is stored by the data storing device, in a manner capable of specifying the place information which is stored together with the image data and in an order determined based on the place information. The data providing device, when receiving a request for the image data stored at the specified storage destination from the client terminal, provides to the client terminal the web page which displays a list of images represented by the image data stored at the specified storage destination among the web pages generated by the page generating device.

In this manner, the web page displaying a list of images represented by the image data stored at the specified storage destination in an order determined based on the place information is provided upon request from the client terminal.

Also, it is preferable that the data providing device can provide image data in a state capable of specifying which image data has been acquired when, so as to permit confirmation of acquisition timing of the image data.

For this purpose, the aforementioned data providing system may be adapted as in a sixth aspect, for example.

In the data providing system of the sixth aspect, the data storing device stores the image data acquired by the image acquiring device at the storage destination specified by the storage destination specifying device together with time information including date or time when the image data has been acquired. The data providing device, when receiving a request for the image data stored at the specified storage destination from the client terminal, provides to the client terminal the image data respectively stored at the specified storage destination in a state capable of specifying a priority order based on the time information stored together with the image data.

In this manner, the image data can be provided in a state capable of specifying the time information including date or time when the image data has been acquired. Accordingly, the user of the client terminal (the producer or the waste generator) can not only visually confirm whether the loads or the like of its own have reached the destination along an appropriate path based on the image data, but also confirm the date or time when the image data has been acquired, that is, the date or time when the loads or the like have passed a given point in the above path, based on the time information specified by the image data.

In the above adaptation, the data providing device may only provide the image data in a state that permits specification of the time information. No specific restriction is imposed on particular embodiments. For example, image data itself added with the time information may be transmitted to the client terminal. Also, images represented by the image data may be displayed as a list on a web page.

In the latter case, it is preferable to display the respective images as a list in an order determined based on the time information, such that date or time indicated by the time information may be displayed in order or reverse order, for example. This is because such a manner of display permits the user to grasp relationship of each image.

For this purpose, the present data providing system may be adapted as in a seventh aspect, for example.

The data providing system of the seventh aspect includes a second page generating device that generates a web page which displays a list of images represented by the image data stored at the storage destination, per storage destination at which the image data is stored by the data storing device, in a manner capable of specifying the time information which is stored together with the image data and in an order of date or time indicated by the time information. The data providing device, when receiving a request for the image data stored at the specified storage destination from the client terminal, provides to the client terminal the web page which displays a list of images represented by the image data stored at the specified storage destination among the web pages generated by the second page generating device.

In this manner, the web page displaying a list of images represented by the image data stored at the specified storage destination in an order determined based on the time information is provided upon request from the client terminal.

If the aforementioned first page generating device and second page generating device are adapted to generate a single web page displaying a list of images in a state capable of specifying both the place information and the time information, it is possible to visually confirm whether the loads or the like have reached the destination along an appropriate path based on the image data, and also confirm whether the loads or the like have passed the appropriate places at appropriate date or time.

The data providing system explained in the above may be composed of a single apparatus or a plurality of apparatus.

An example of the data providing system composed of a plurality of apparatus may include, as in an eighth aspect, a management server provided with the image acquiring device, and a providing server provided with the area extracting device, the storage destination specifying device, the data storing device and the data providing device. The management server includes a data transmission device that transmits image data acquired by the data acquiring device to the providing server. The providing server may be adapted to extract the storage destination specifying area through the area extracting device, specify the storage destination through the storage destination specifying device, and store the image data at the storage destination through the data storing device, for each image data received from the management server.

In this manner, the aforementioned data providing system can be composed of the management server and the providing server.

In the above adaptation, the data transmission device of the management server may transmit to the providing server all the image data acquired by the image acquiring device, or transmit only the image data representing image including the storage destination specifying area.

For this purpose, as in a ninth aspect, the management server may include an area determining device that determines whether the image represented by the image data acquired by the image acquiring device contains an image area having predetermined characteristics as characteristics to be possessed by the storage destination specifying area. The data transmission device may transmit to the providing server only the image data determined to contain the image area having the characteristics by the area determining device.

In this manner, only the image data determined to represent the image containing the storage destination specifying area on the management server side is transmitted from the management server to the providing server. Therefore, the image data representing the image which does not contain the storage destination specifying area is not transmitted between the both servers. That is, data unnecessary to be processed for storage of image data, such as the image data representing the image which does not contain the storage destination specifying area, is not transmitted. In this manner, it is possible to restrict useless processing load to be applied on the providing server side and also inhibit needless increase of traffic between the both servers.

In another example of the data providing system composed of a plurality of apparatus, as in a tenth aspect, a management server including the image acquiring device, the area extracting device, and the storage destination specifying devices may be connected to a providing server including the data storing device and the data providing device, in a manner capable of communicating data. The management server may include a data transmission device that transmits to the providing server the image data of which storage destination is specified by the storage destination specifying device in a state capable of specifying the storage destination. The providing server may be adapted to store the image data received from the management server at the storage destination determined by the image data through the data storing device.

In this manner, the aforementioned data providing system can be composed of the management server and the providing server.

The image data of which storage destination is specified is transmitted from the management server to the providing server. Therefore, the image data of which storage destination specifying area is not extracted or the image data of which storage destination cannot be specified from the storage destination specifying area on the management server side is not transmitted between the both servers. That is, data unnecessary to be processed for storage of image data, such as the image data representing the image which does not contain the storage destination specifying area or the image data representing the image of which storage destination specifying area does not indicate an appropriate storage destination, is not transmitted. In this manner, it is possible to restrict useless processing load to be applied on the providing server side and also inhibit needless increase of traffic between the both servers.

A server of an eleventh aspect includes all the devices provided in the management server according to one of the eighth to tenth aspect.

The server adapted as such can constitute a part of the management server according to one of the eighth to tenth aspects.

A server of a twelfth aspect includes all the devices provided in the providing server according to one of the eighth to tenth aspects.

The server adapted as such can constitute a part of the providing server according to one of the eighth to tenth aspects.

A program of a thirteenth aspect is a program that makes a computer system execute various process steps so that the computer system functions as all the devices according to one of the first to seventh aspects.

The computer system controlled by such a program may constitute a part of the data providing system according to one of the first to seventh aspects.

A program of a fourteenth aspect is a program that makes a computer system execute various process steps so that the computer system functions as all the devices provided in the management server according to one of the eighth to tenth aspects.

The computer system controlled by such a program may constitute a part of the management server according to one of the eighth to tenth aspects.

A program of a fifteenth aspect is a program that makes a computer system execute various process steps so that the computer system functions as all the devices provided in the providing server according to one of the eighth to tenth aspects.

The computer system controlled by such a program may constitute a part of the providing server according to one of the eighth to tenth aspects.

Each of the aforementioned programs is composed of lines of instructions arranged in an order appropriate to be processed by the computer system. Each program may be provided to the data providing system, the management server, the providing server, or the user utilizing the forgoing, via various recording media or communication lines.

BRIEF DESCRIPTION OF THE DRAWINGS

FIG. 10 is a flowchart illustrating a transmission data preparation process of the another embodiment.

EXPLANATION OF REFERENCE NUMERALS

Figure 1:
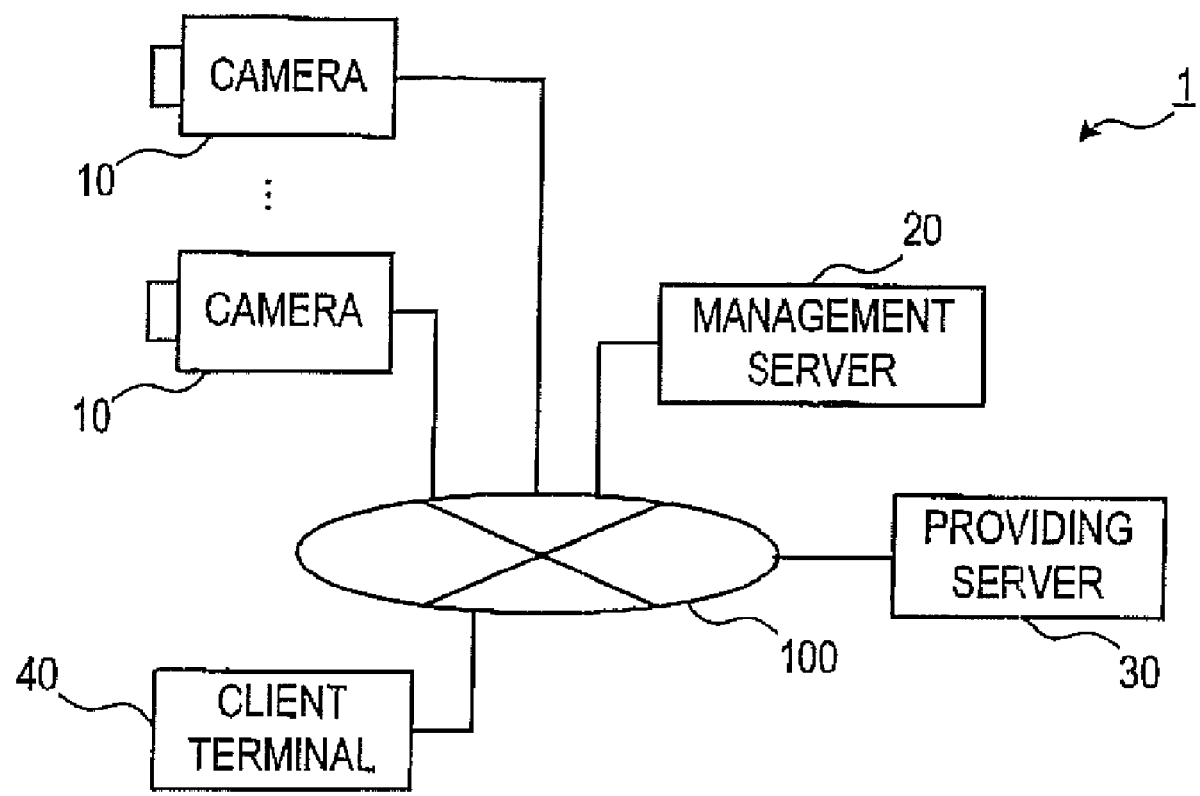
FIG. 1 is a block diagram showing a structure of a data providing system.

1 . . . data providing system, 10 . . . camera, 20 . . . management server, 30 . . . providing server, 40 . . . client terminal, 50 . . . server, 200 . . . two-dimensional code.

BEST MODE FOR CARRYING OUT THE INVENTION

Embodiments of the present invention will be explained hereinafter, by way of drawings.

(1) Overall Structure

A data providing system 1 includes cameras 10, a management server 20, a providing server 30, a client terminal 40, and so on, all of which are connected via a communication network (Internet, in the present embodiment) 100 in a manner capable of communicating data.

The cameras 10 are known cameras (web cameras) respectively adapted to shoot predetermined shooting areas to generate image data representing images of the predetermined shooting areas and sequentially transmit the generated image data to the management server 20.

Each of the management server 20 and the providing server 30 is composed of known computer systems adapted to execute later explained processes.

The data providing system 1 according to the present embodiment exemplifies a system which permits confirmation that wastes in waste disposal (or a container of the wastes; hereinafter referred to as "loads") have reached a waste disposal site as a destination along an appropriate path. In this adaptation, the cameras 10 are respectively disposed at positions where the places (reaching point 1 to reaching point n) which the loads pass through can be shot in intermediate points of the above path and in the waste disposal site.

(2) Processes Executed by Each Server (2-1) User Registration Process by the Providing Server 30

Process steps of a user registration process executed by (a CPU of) the providing server 30 are described hereinafter by way of FIG. 2. The user registration process is started when an access is received which requests user registration from the client terminal 40.

When the user registration process is started, registration information including information to be registered is firstly requested from the client terminal 40 as an access source (S110). Here, a registration page, that is a web page provided with entry fields for entering registration information, and a transmit button for transmitting the registration information entered to the entry fields to the providing server 30, is transmitted from the providing server 30 to the client terminal 40. The "registration information" herein corresponds to a user name, a password, and identification information (user ID) for identifying the user. After entry of various information to the entry, fields provided on the web page and selection of the transmit button on the client terminal 40 which has received the web page, information entered to the entry fields is transmitted to the providing server 30 as the registration information.

Subsequently, it is checked whether the registration information is received from the client terminal 40 as the access source (S120).

When it is determined in S120 that the registration information is not received (S120: NO), the process returns to S120 unless elapsed time after the request has been made in S110 has reached time to time out (five minutes, for example) (S130: NO). If the elapsed time has reached the time to time out (S130: YES), the present user registration process is ended immediately.

When it is determined that the registration information is received in the aforementioned S120 (S120: YES), the registration information received in this manner is registered (S140). Here, the registration information, that is, the user name, password and identification information, and specified storage destination information indicating a specified storage area in the storage unit of the providing server 30, are registered in a manner associated with each other to a user table (database for user registration) stored in a storage unit of the providing server 30. The "specified storage area" indicated by the specified storage destination information is a storage area (specified folder, for example) secured for the user of the client terminal 40 each time the registration in S140 is carried out.

Subsequently, code information is generated based on the registration information received in S120 (S150). Here, data indicating a two-dimensional code corresponding to the encoded user name among the registration information received in S120 is generated as the code information.

Figure 3:
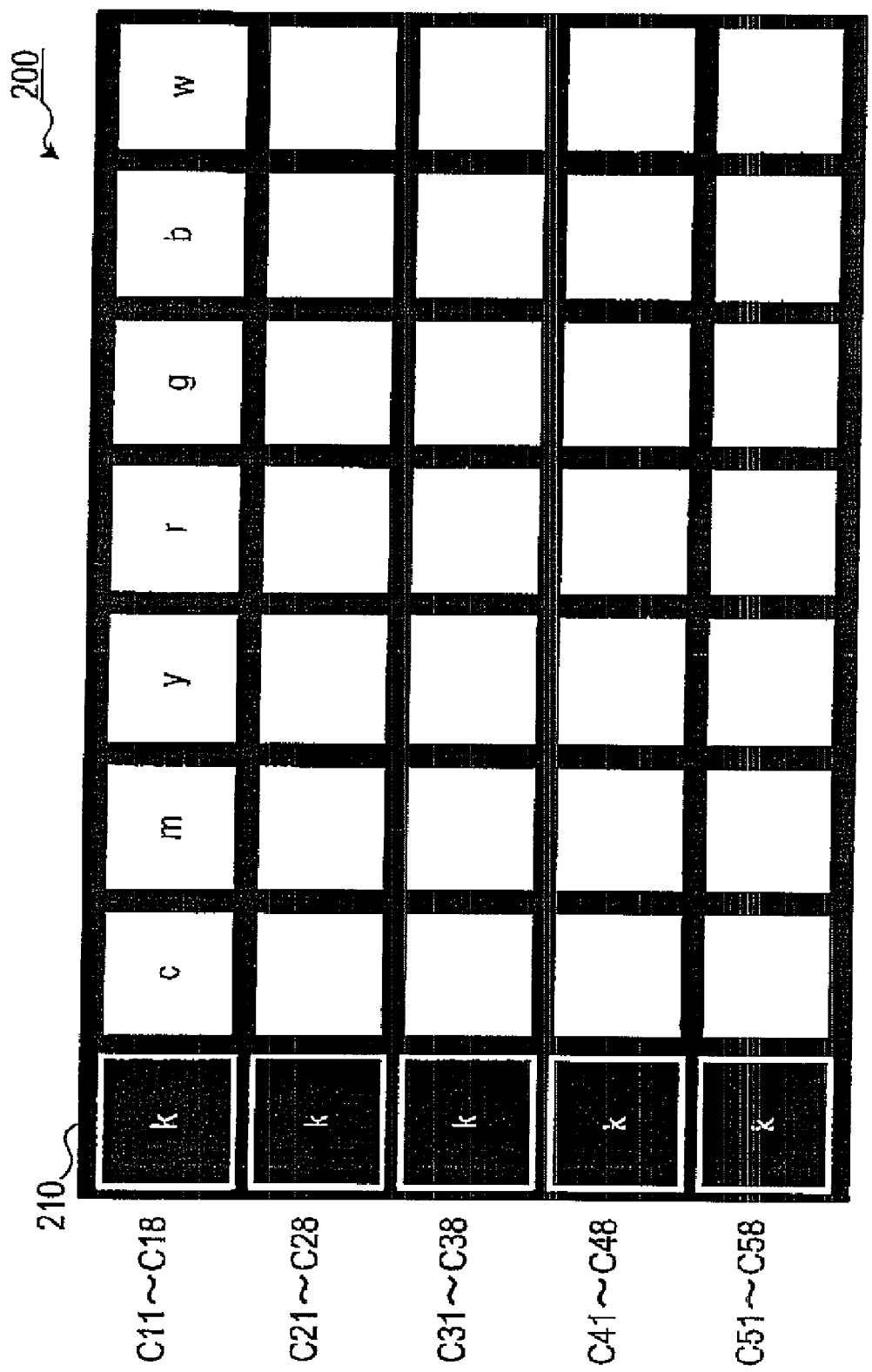
FIG. 3 is a diagram showing a two-dimensional code.

The two-dimensional code generated as the code information in the present embodiment is structured, as shown in FIG. 3, such that cells C11-Cpn, in the size of p×n (p=5, n=8, in the present embodiment; the same applies hereinafter), are arranged at constant intervals on a black background area 210.

Cells C11-C1n on the first row of the two-dimensional code 200 indicate an area (reference area) sequentially marked with all colors, each color of which can be added to each cell C of the two-dimensional code 200. In the present embodiment, cells C can be marked with the colors of black (k), cyan (c), magenta (m), yellow (y), red (r), green (g), blue (b) and white (w). The reference area is sequentially marked with those colors in this order.

Cells C11-Cp1 positioned at the forefront of each column of cells C are specific cells for specifying the location of the two-dimensional code 200. A characteristic pattern indicating the area of the two-dimensional code 200 is formed by the color added to specific cells (black (k) in the present embodiment) and the background area 210. The characteristic pattern may be achieved by other formation.

Cells C21-Cpn (excluding the cells at the forefront) on the second and subsequent rows are divided per line into cell groups, each composed of one or more cells C. Cells C in each cell group are marked (cells C are colored) with a color, or a combination of colors, associated with unit information (one or more letters) to be indicated by the cell group.

In the aforementioned S150, respective cells C are marked such that information string composed of unit information indicated by the respective cell groups corresponds to a letter string indicating the user name. Cells C excluding the cells in the reference area of the two-dimensional code 200 are marked as those which specify information other than the letter string indicating the user name. Here, explanation on other information is omitted so as to facilitate understanding of the present invention.

Subsequently, the code information generated in the aforementioned S150 is registered (S160). Here, the code information generated in S150 is stored in a storage area for code information among the storage unit of the providing server 30. Also, code storage destination information indicating the storage area is registered to the user table as information associated with various information (user name, password, identification information, and specified storage destination information) registered to the user table in S140.

After the code information generated in the aforementioned S150 is transmitted to the client terminal 40 (S170), the present user registration process is ended.

The two-dimensional code indicated by the code information is recorded (printed on a sheet of paper, for example) by the user of the client terminal 40 which received the code information. Thereafter, the loads are delivered toward a waste disposal site or requested to be delivered through a deliverer in a state that the two-dimensional code is attached to the wastes (or to the container of the wastes) in waste disposal.

(2-2) Transmission Data Preparation Process by the Management Server 20

Process steps of a transmission data preparation process executed by (a CPU of) the management server 20 are described hereinafter by way of FIG. 4. The transmission data preparation process is repetitively executed after the management server 20 is activated.

When the transmission data preparation process is started, the process firstly stands by until image data is received from the cameras 10 (S210: NO).

When it is determined in S210 that image data is received (S210: YES), it is checked whether the image represented by the image data includes an area indicating the two-dimensional code 200 (S220). Here, a search is conducted for a pattern showing characteristics of the two-dimensional code 200 (that is, an area composed of the specific cells and the background area 210; the same applies hereinafter) from the image represented by the image data. As a result of detection of such a pattern, it is determined that the area indicating the two-dimensional code 200 is included.

When it is determined in S220 that the area indicating the two-dimensional code 200 is not included (S220: NO), the process returns to S210 after the image data received in S210 is discarded (without being temporarily stored (buffered) as transmission waiting data).

When it is determined in S220 that the area indicating the two-dimensional code 200 is included (S220: YES), shooting information concerning the camera 10 which has transmitted the image data is added to the image data received in S210 (S230). The shooting information herein is information that permits identification of the place (reaching point 1 to reaching point n) shot by the camera 10 as an acquisition source of the image data, and date and time when the image data has been acquired.

After the image data added with the shooting information is temporarily stored as transmission waiting data in S230 (S240), the process returns to S210.

The image data temporarily stored in S240 is sequentially transmitted to the providing server 30 by the data transmission process (see FIG. 5) executed in parallel with the transmission data preparation process. Particularly, in case that there is transmission waiting data temporarily stored in S240 of FIG. 4 (S250: YES), the earliest transmission waiting data (which has been temporarily stored at the earliest timing)

among the transmission waiting data is transmitted to the providing server 30 (S260). Steps of S250 and S260 are repeated until there is no more temporarily stored transmission waiting data (S250: NO).

(2-3) Data Storage Process by the Providing Server 30

Process steps of a data storage process executed by (a CPU of) the providing server 30 in parallel with the aforementioned user registration process are described hereinafter by way of FIG. 6. The data storage process is repetitively executed after the providing server 30 is activated.

When the data storage process is started, the process firstly stands by until untreated image data is temporarily stored (S310: NO). In the present embodiment, the providing server 30, when receiving the image data transmitted from the management server 20 in S260 of FIG. 5, temporarily stores the transmitted image data as process waiting data which is an object to be further processed. In S310, in case that the process waiting data is temporarily stored as such, it is determined that untreated image data is temporarily stored.

Thereafter, when it is determined in S310 that untreated image data is temporarily stored (S310: YES), the earliest image data among the temporarily stored untreated image data is selected as the object to be further processed (S320).

Subsequently, based on the image data selected in S320 which is the object to be further processed, it is checked whether the area of the two-dimensional code 200 is contained in the image represented by the image data (S330). Here, areas containing color components other than those used for marking cells C of the two-dimensional code 200 in the image represented by the image data acquired in S320 is processed to be areas of no significance, such as by being firstly colored with color components which are not used for marking cells C. Subsequently, a search of the pattern showing characteristics of the two-dimensional code 200 is preferentially carried out to the area other than the areas which is made no significance by this process. When such a pattern is detected, it is then determined that the two-dimensional code 200 is contained. For the check in 330, a manner is adopted which is different from the case carried out by the management server 20 in S220 of FIG. 4. As a result, a double check is performed to the image data which has been wrongly determined by the management server 20 side that the two-dimensional code is contained.

When it is determined in S330 that the two-dimensional code 200 is not contained (S330: NO), the process returns to S310.

When it is determined in S330 that the two-dimensional code 200 is contained (S330: YES), one or more areas of the two-dimensional code 200 are extracted from the image represented by the image data selected in S320 (S340). Here, the areas showing the characteristics of the two-dimensional code 200 are respectively extracted from the image represented by the image data selected in S320 as the area of the two-dimensional code 200. Then, image data made up of an area image extracted as such is respectively generated.

Subsequently, it is checked whether there is an untreated area(s) among the area(s) of the two-dimensional code 200 extracted in S340 (S350). Here, it is checked whether there is an untreated area(s), among the area(s) of the two-dimensional code 200 extracted in S340, in which division of cells C and identification of information have not been carried out in later processes.

When it is determined in S350 that there is an untreated area(s) (S350: YES), the reference area is extracted from the area which has been extracted earliest in S340 among such untreated area(s) (S360). Here, cells C11-C1n (that is, reference area) on the first row in the two-dimensional code 200 are extracted among the area(s) extracted in S340. From the area(s) extracted in S340, image data respectively indicating the reference area and the area excluding the reference area are generated.

Subsequently, the area excluding the reference area among the area(s) extracted in S340 is divided into areas per cell C (S370). Here, the area excluding the reference area is sequentially scanned per each line from the cell in head to the cell in tail, and divided into respective areas starting from a detection of the color (black) of the background area 210 to the next detection of the color (black) of the background area 210. In this manner, divided image data respectively representing images divided as such are generated.

Subsequently, information indicated by the each area per cell C divided in S370 is identified (S380). Here, it is checked, in an order of division, with the color of which position in the reference area extracted in S360, each cell C as the divided image is marked. In the present embodiment, a letter string including one or more numerals and/or alphabets is registered in association with each color or a combination thereof in the reference area to a correspondence table as a database. The correspondence table is stored in the storage unit of the providing server 30. Accordingly, after it is checked, with the color of which position in the reference area, each cell C is marked, an information string corresponding to the color of the position or the combination thereof is specified based on the correspondence table. Thereby, the information string is temporarily stored.

Figure 2:
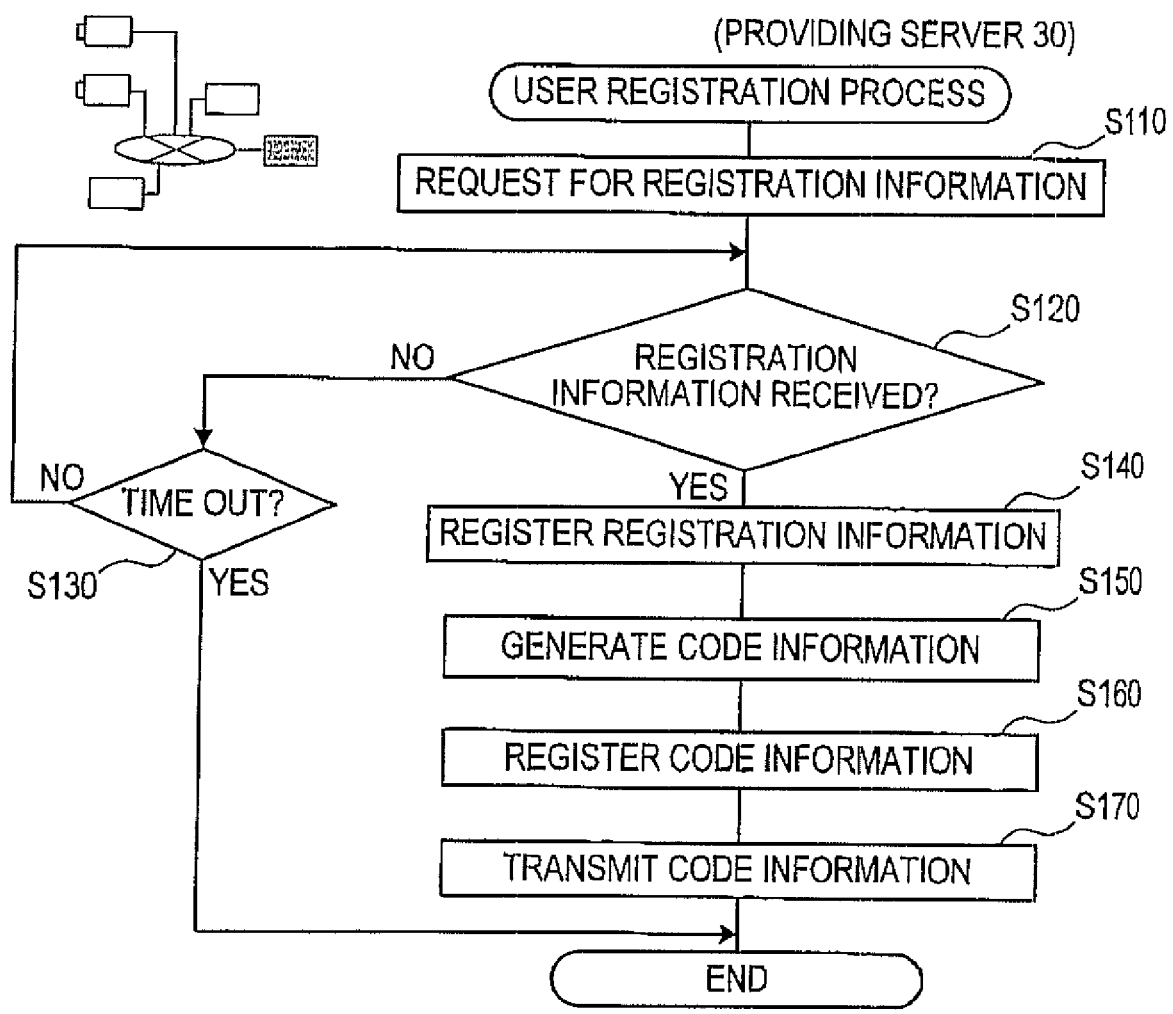
FIG. 2 is a flowchart illustrating a user registration process.

In the present embodiment, the two-dimensional code 200 is generated as a code indicating the user name registered in the user registration process of FIG. 2. If the two-dimensional code 200 in the area(s) extracted in S340 is the normal two-dimensional code 200, the information string specified based on the correspondence table as above should indicate the user name registered to the user table.

In this manner, after identification in S380 is carried out, the process returns to S350. Thereafter, the steps from S350 to S380 are repeated until all the two-dimensional codes 200 extracted in S340 undergo the steps from S350 to S380.

Subsequently, when it is determined in S350 that there is no more untreated area, that is, the steps from S350 to S380 are carried out to all the two-dimensional codes 200 (S350: NO), the storage destination(s) of the image data selected in S320 is specified from each information string specified in S380 (S390). Here, if the user name identical to the information string specified in S380 is registered to the aforementioned user table, the specified storage information corresponding to the user name is also registered. Thus, the storage destination(s) indicated by the specified storage information is specified as the storage destination(s) of the image data selected in S320.

After the image data selected in S320 is stored (memorized) together with the shooting information added to the image data in each storage destination specified in S390 (S400), the process returns to S310. In case that no storage destination has been able to be specified in S390, the process returns to S310 without storing the image data in S400.

(2-4) Data Providing Process by the Providing Server 30

Process steps of a data providing process executed by (a CPU of) the providing server 30 are described hereinafter by way of FIG. 7. The data providing process is started when an access is received which requests image data from the client terminal 40.

When the data providing process is started, authentication information is firstly requested from the client terminal 40 as the access source (S510). Here, an authentication page that is a web page provided with entry fields for inputs of password and identification information as authentication information and a transmit button for transmitting to the providing server 30 the information entered to the entry fields are transmitted from the providing server 30 to the client terminal 40. From the client terminal 40 which has received the web page, the password and the identification information are transmitted as authentication information through operation such as entry of various information to the entry fields provided on the web page and selection of the transmit button.

Subsequently, it is checked whether authentication information is received from the client terminal 40 (S520).

When it is determined in S520 that authentication information is not received (S520: NO), and then if elapsed time after the request in S510 has not reached time to time out (five minutes, for example) (S530: NO), the process returns to S520. If the elapsed time has reached the time to time out (S530: YES), the present data providing process is immediately ended.

When it is determined in the aforementioned step S520 that authentication information is received (S520: YES), authentication is performed based on the authentication information received as such (S540). Here, if there is a combination of password and identification information which coincides with the authentication information received in S520 among the combinations of password and identification information registered to the user table, it is determined that authentication is successful (authentication OK).

If it is determined in S540 that authentication is unsuccessful (S540: NO), the present data providing process is ended after transmitting an authentication error warning message to the client terminal 40 (S550). In S550, a warning page which is a web page for notification of an error message is transmitted to the client terminal 40.

Figure 8:
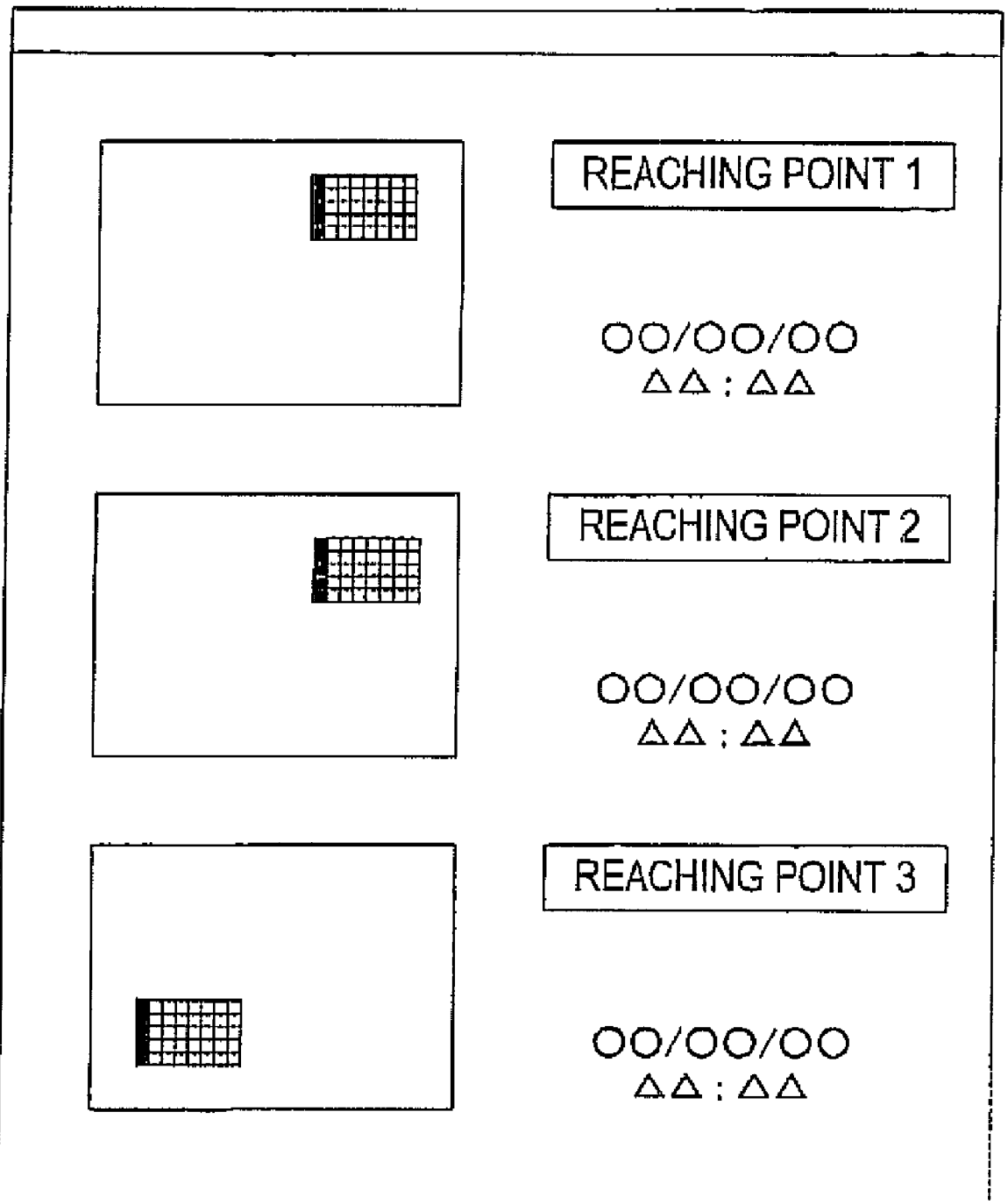
FIG. 8 is a diagram showing a state in which a list page is displayed.

When it is determined in S540 that authentication is successful (authentication OK), a list page is generated which is a web page displaying a list of images represented by a plurality of image data (S560). Here, a web page is generated as a list page which displays a list of thumbnails (index images) of the images represented by all the image data stored at the storage destination indicated by the specified storage destination information which corresponds to the identification information as the authentication information received in S520 among the specified storage destination information registered to the user table. Also, the list page displays images of a list together with information specified by the shooting information added to the image data representing the images. Furthermore, the list page is generated as a web page in which the images of a list are arranged from top to bottom in a priority order based on the specified information. In the web page of the present embodiment, each image is disposed in an order of reaching points specified by the shooting information and each image is displayed together with the reaching point, date and time specified by the shooting information (see FIG. 8). In the list page, each thumbnail is assigned a link (hyperlink) to the image data corresponding to the thumbnail. Operation of selecting the thumbnail permits requesting the image data from the providing server 30.

Subsequently, the list page generated in S560 is transmitted to the client terminal 40 (S570). In the client terminal 40 which receives the list page, the web page is displayed in which a plurality of thumbnails are arranged in a vertical direction. Thereafter, one of the thumbnails is selected, and a command for requesting the image corresponding to the thumbnail is transmitted from the client terminal 40.

After the list page is transmitted in this manner, it is checked whether a command for requesting the image data is received from the client terminal 40 (S580).

If it is determined in S580 that a command for requesting the image data is not received (S580: NO), the process returns to S580 unless elapsed time after the transmission of the list page in S570 (or after the transmission of the image data in S600) has not reached time to time out (five minutes, for example) (S590: NO). If the elapsed time has reached the time to time out (S590: YES), the present data providing process is ended.

If it is determined in S580 that a command for requesting the image data is received (S580: YES), the image data requested by tile request command is read from the corresponding storage destination to be sent to the client terminal 40 (S600). Thereafter, the process returns to S580.

(3) Operation and Effect

According to the data providing system 1 adapted as such, an area of the two-dimensional code 200 is extracted from the image represented by the image data collected via the cameras 10. The image data is stored at the storage destination specified by the two-dimensional code 200. The image data stored as such is provided upon request from the client terminal 40.

Moreover, in the present embodiment, each camera 10 is disposed to shoot an image of a place in the path which the loads attached with the two-dimensional code 200 pass through. Thus, image data representing the image of the loads can be acquired. Also, the image contains an image area of not only the loads but the background of the loads. Therefore, the image permits visual confirmation that the loads have passed the aforementioned place from the image areas. The image data acquired as such is stored at the storage destination specified by the two-dimensional code 200 contained in the image represented by the image data. Thereafter, the image data can be provided to the client terminal 40 upon request.

That is, a waste generator of wastes can request from the providing server 30 the image data at the storage destination specified by the two-dimensional code 200 attached to the loads of its own through the client terminal 40. Thereby, based on the image data provided upon such request, the waste generator can visually confirm whether the loads of its own have reached the destination along an appropriate path.

As noted above, since visual confirmation through image is available as such, whether the loads have reached the destination along an appropriate path can be confirmed with high reliability, as compared to the conventional manner of confirmation through checking items on a sheet of paper.

Figure 4:
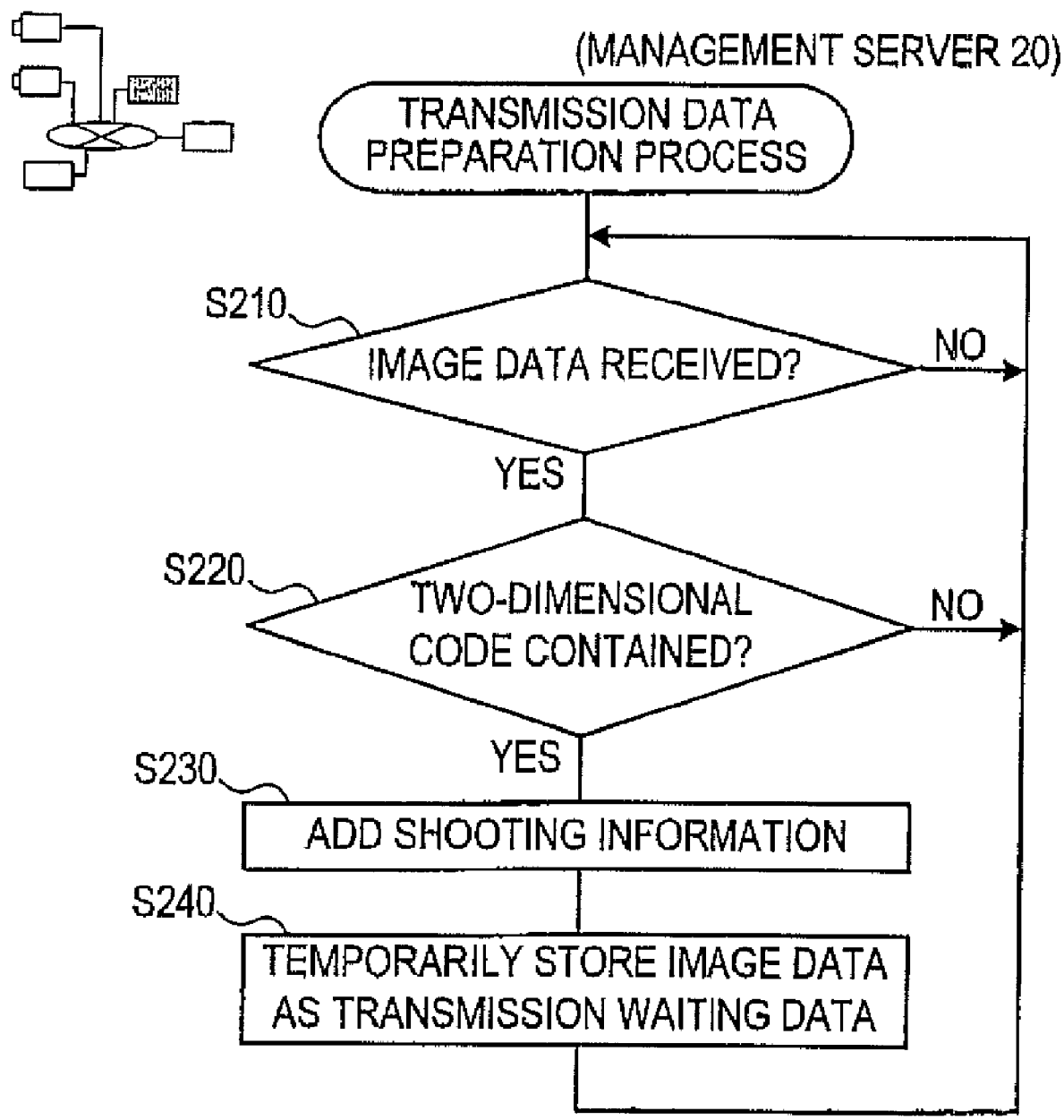
FIG. 4 is a flowchart illustrating a transmission data preparation process.

Also, the management server 20 can determine whether the area of the two-dimensional code 200 is contained in the image represented by the image data based on the characteristics as the two-dimensional code 200 in S220 of FIG. 4.

Figure 6:
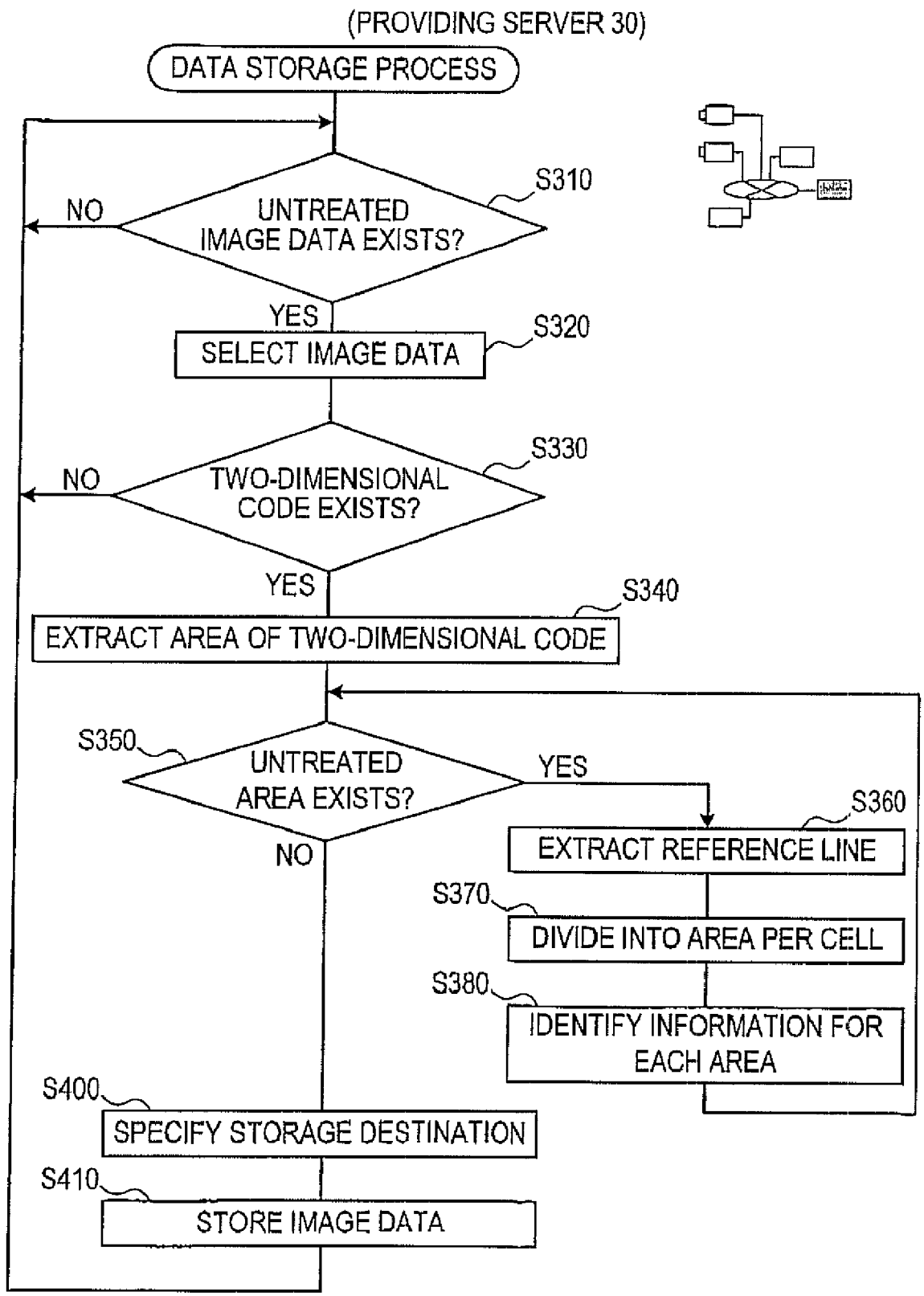
FIG. 6 is a flowchart illustrating a data storage process.

Also, the providing server 30 can extract the area of the two-dimensional code 200 out of the image represented by the image data based on the characteristics as the two-dimensional code 200 in S340 of FIG. 6.

Figure 7:
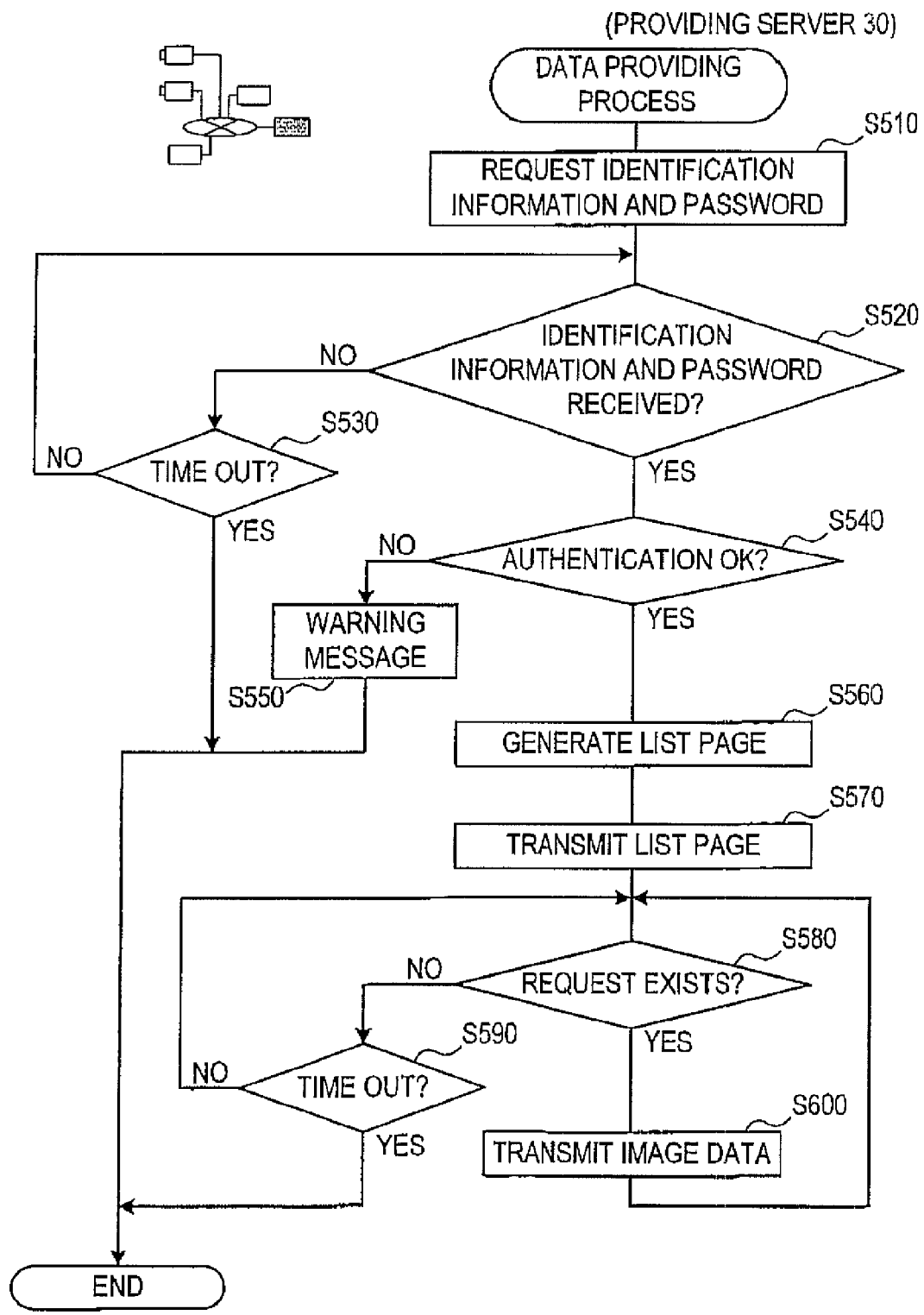
FIG. 7 is a flowchart illustrating a data providing process.

Also, request for the image data from the client terminal 40 has to be a request together with the password and the identification information preregistered by the user of the client terminal 40 (S510-S540 of FIG. 7). Only the image data stored at the storage destination corresponding to the password and the identification information is provided to the client terminal 40.

As a result, a third party who does not know the password and the identification information of the specific user is unable to make request with an appropriate password and identification information. Thus, confirmation on whether the loads have reached the destination along an appropriate path by a third party other than the preregistered user, that is, other than the waste generator, can be effectively inhibited.

Also, the providing server 30 can provide upon request from the client terminal 40 the web page which displays a list of the images represented by the image data stored at the specific storage destination in an order of the places where the images are shot (reaching points 1-n). Displaying a list of the images in such an order is favorable since it permits user to easily grasp the relation between respective images.

Also, the list page provided by the providing server 30 represents the images and the places (reaching point 1 to reaching point n) where the images have been shot. Thus, it is possible to provide image data in a state that the places where the images have been shot can be specified. Accordingly, the user of the client terminal 40 (waste generator) can not only visually confirm whether the loads of its own have reached the destination along an appropriate path based on the images but also confirm the places where the images have been shot.

Also, the providing server 30 can provide upon request from the client terminal 40 the web page displaying a list of the images represented by the image data stored at the specified storage destination together with date and time when the images have been shot. Accordingly, the user of the client terminal 40 (waste generator) can not only visually confirm whether the loads of its own have reached the destination along an appropriate path based on the images but also confirm the date and time when the images have been shot, that is, the date and time when the loads have passed the aforementioned places based on the date and time displayed together with the images.

Figure 5:
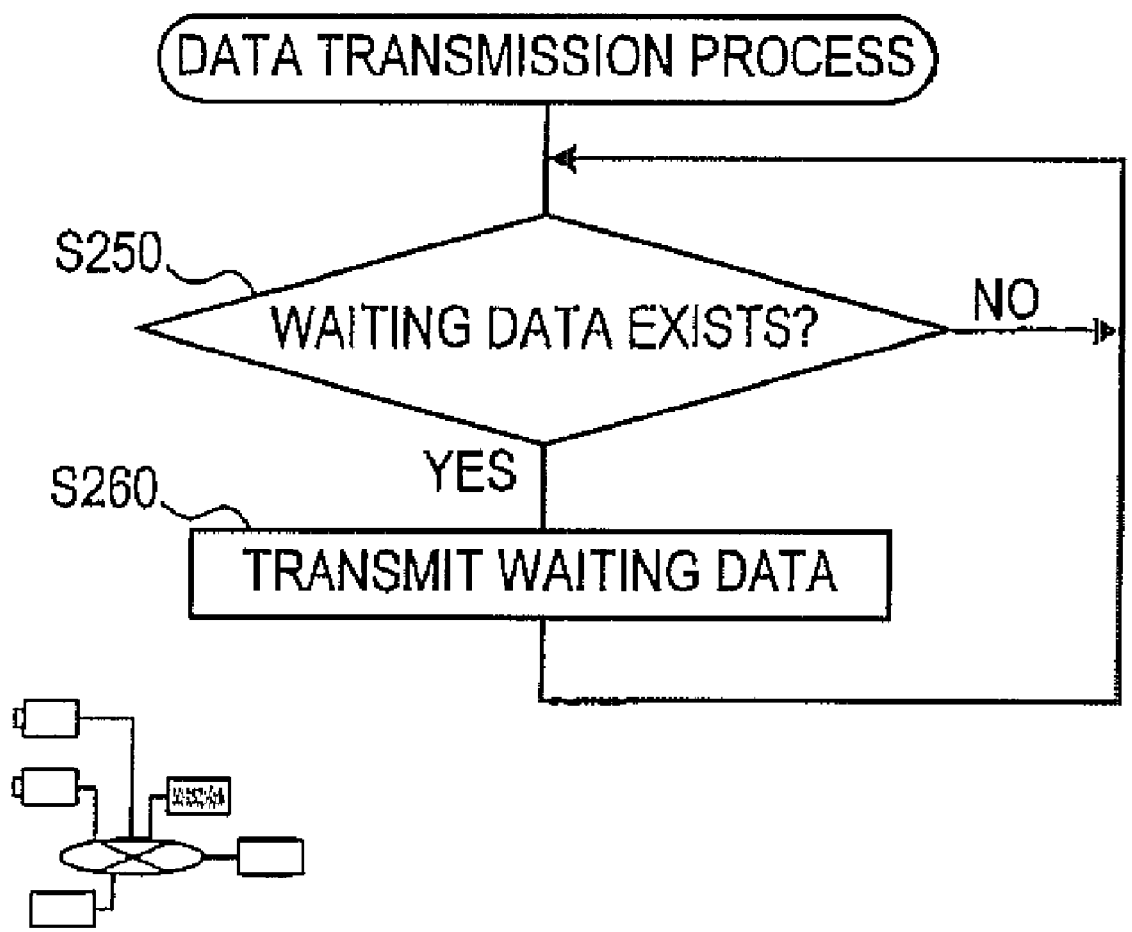
FIG. 5 is a flowchart illustrating a data transmission process.

Also, the management server 20 transmits to the providing server 30 only the image data containing the two-dimensional code 200 in the image represented by the image data received from the cameras 10 (S220-S240 of FIG. 4 and S260 of FIG. 5). As such, since only the image data determined on the management server 20 side to represent the image containing the two-dimensional code 200 is transmitted from the management server 20 to the providing server 30, the image data representing the image which does not contain the two-dimensional code 200 is not transmitted between the servers. That is, data unnecessary to be processed for storage of image data, such as the image data representing the image which does not contain the two-dimensional code 200, is not transmitted. In this manner, it is possible to restrict useless processing load to be applied on the providing server 30 side and also inhibit needless increase of traffic between the servers.

(4) Variation

The embodiment of present invention has been explained in the above. However, the present invention should not be limited by the above described embodiment. It should be noted that the present invention can be practiced in various manners without departing from the technical scope of the present invention.

Figure 9A:
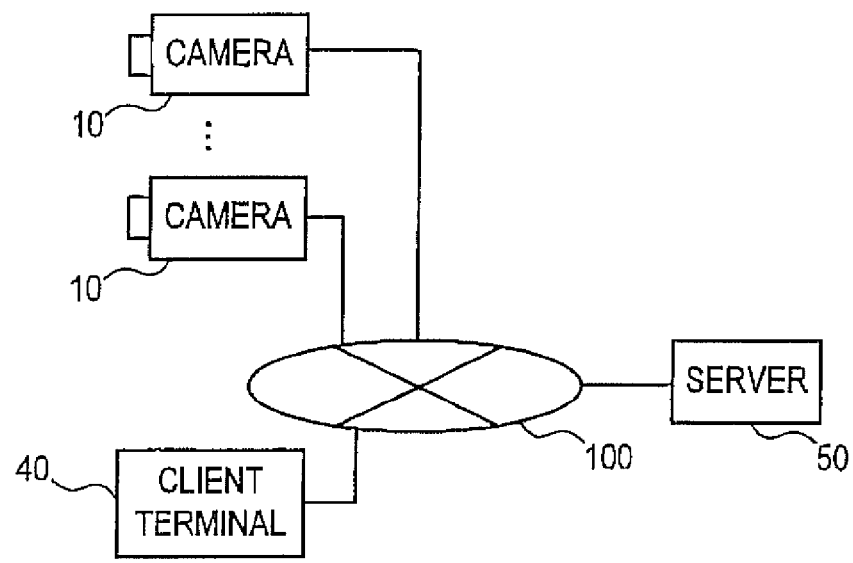
FIGS. 9A-9B are diagrams showing a data providing system of another embodiments.

For instance, the above embodiment exemplifies the adaptation including the management server 20 and the providing server 30 as two separate apparatus. However, these servers may be adapted as a single server 50 as shown in FIG. 9A.

Figure 9B:
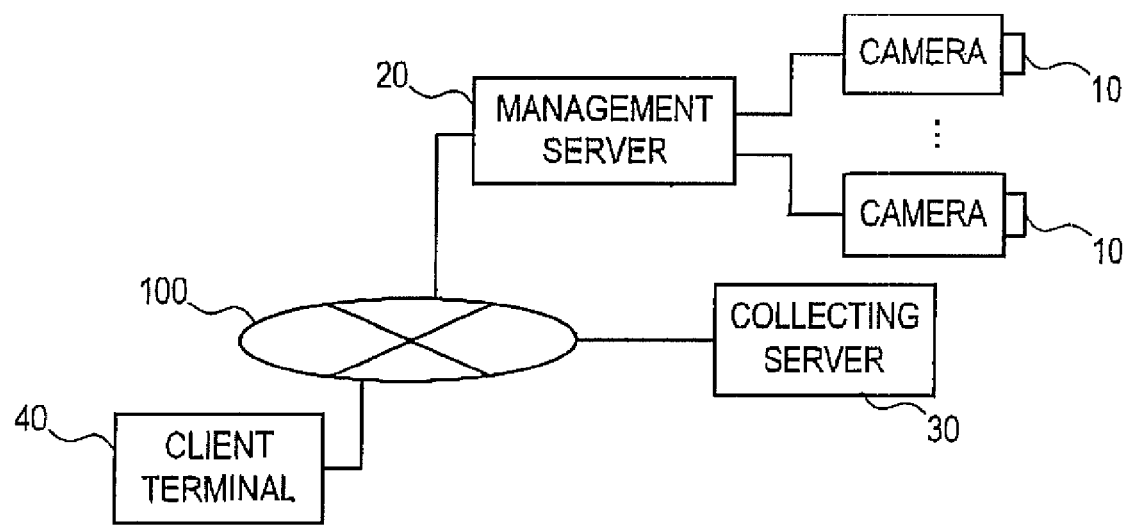

Also, the above embodiment exemplifies the adaptation in which the cameras 10 transmit the image data to the management server 20 via the communication network 100 as needed. However, the cameras 10 may be directly connected to the management server 20 as shown in FIG. 9B.

Also, the above embodiment exemplifies the system which permits confirmation that wastes in waste disposal have reached a waste disposal site along an appropriate path. However, the present invention can be also adapted as a system which permits confirmation that loads in distribution have reached the destination along an appropriate path. In that case, the cameras 10 may be respectively disposed at positions where the places which the loads pass through can be shot in intermediate points of the above path and in the destination.

Also, the above embodiment exemplifies the adaptation that specifies the storage destination of the image data based on the two-dimensional code 200. However, in order to specify the storage destination of the image data, use of other than the two-dimensional code 200 may be considered as long as the storage destination can be specified based on the image area.

Also, the above embodiment exemplifies the adaptation that specifies the storage destination of the image data using the two-dimensional code 200 as shown in FIG. 3. However, as long as the area can be specified in S220 of FIG. 4 or in S330-S340 of FIG. 6, types of two-dimensional codes other than the two-dimensional code 200 shown in FIG. 3 may be used.

Also, the above embodiment exemplifies the adaptation that the providing server 30 stores the image data received from the management server 20 in the storage unit of its own. However, the image data received from the management server 20 may be stored in other apparatus which can communicate data with the providing server 30. In this case, for example, if a storage area of a storage unit of the other apparatus capable of communicating data with the providing server 30 is assumed as a plurality of storage destinations, one of the storage destinations (or a new storage destination) may be selected and the image data may be then transmitted to be stored at the selected storage destination.

Also, the above embodiment exemplifies the adaptation that permits acquisition of the image data representing the image at a plurality of places by collecting the image data from the cameras 10 which respectively shoot different areas. However, in order to acquire the image data representing the images of a plurality of places, the shooting areas of the cameras IO may be changed, and the image data in the respective shooting areas may be collected. In the case of such adaptation, it is preferable that the acquisition source of the respective image data is set such that images can be shot at a plurality of transmit points which the loads pass through until reaching the destination (such that the shooting area is sequentially changed). In this manner, whether or not the loads have passed each of the transit points can be confirmed based on the image data.

Also, the above embodiment exemplifies the adaptation in which the providing server 30 provides as the list page to the client terminal 40 the web page in which the images represented by the image data stored at the specified storage destination are arranged in an order of reaching points. However, the providing server 30 may generate and provide a list page in which the images represented by the image data stored at the specified storage destination are arranged in an order of early to late or late to early date and time of image acquisition.

Also, the above embodiment exemplifies the adaptation in which identification of the information string indicated by the two-dimensional code 200 is carried out on the providing server 30 side (S360-S380 of FIG. 6). However, such identification of the information string indicated by the two-dimensional code 200 may be carried out on the management server 20 side.

For this purpose, the records of the user table registered immediately before in S170 of FIG. 2 may be transmitted to the management server 20 and stored on the management server 20 side as well so that the user table can be referred to on the management server 20 side. Furthermore, the transmission data preparation process and the data storage process may be designed as below.

First of all, as for the transmission data preparation process, when it is determined "YES" in S210 and S220 which correspond to the steps of FIG. 4, as shown in FIG. 10, the steps of S740-S800 may be carried out which correspond to S340-S400 of FIG. 6. Only when the storage destination is specified in S800 (S810: YES), S230 and S240 which correspond to the steps of FIG. 4 may be carried out. In S230 of this case, the specified storage destination information specified in S800 just before S230 is also added to the image data.

Figure 11:
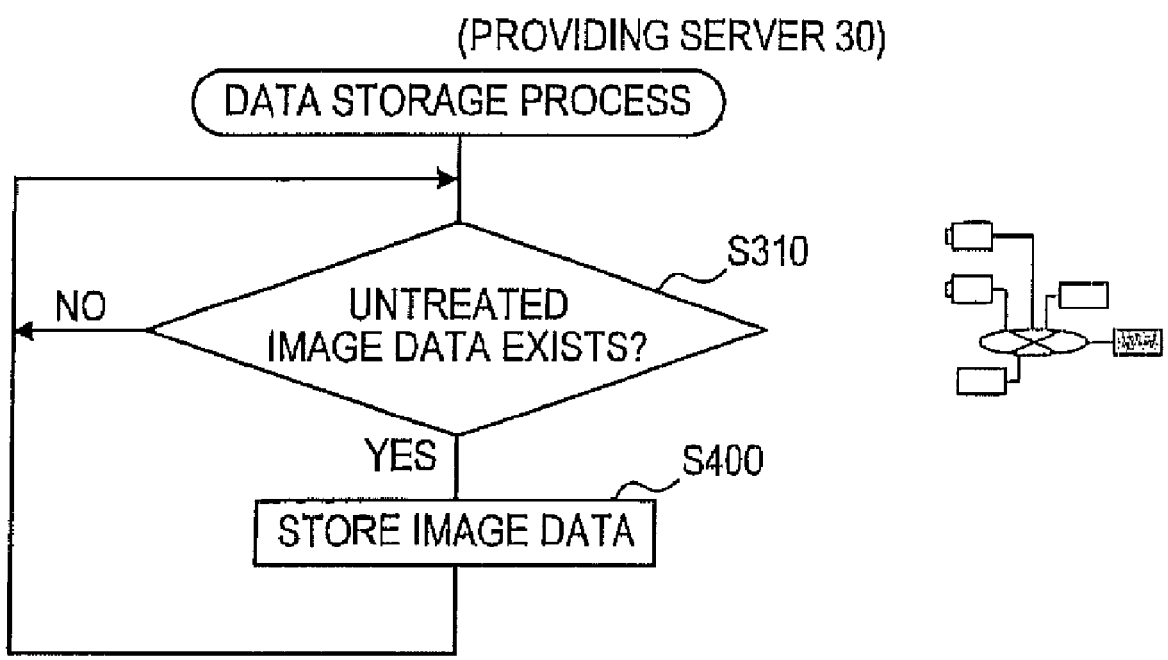
FIG. 11 is a flowchart illustrating a data storage process of the another embodiment.

As for the data storage process, when it is determined "YES" in S310 which corresponds to the step of FIG. 6, as shown in FIG. 11, S400 may be carried out which corresponds to the step of FIG. 6. In S400 of this case, the untreated image data may be stored at the storage destination indicated by the specified storage destination information added to the untreated image data.

Adapted as such, the image data of which storage destination is specified is transmitted from the management server 20 to the providing server 30. Therefore, the image data from which the two-dimensional code 200 is not extracted on the management server 20 side or the image data of which storage destination cannot be specified from the two-dimensional code 200 is not transmitted between the servers. That is, data unnecessary to be processed for storage of image data, such as the image data representing the image which does not contain the two-dimensional code 200 or the image data representing the image of which two-dimensional code 200 does not indicate an appropriate storage destination, is not transmitted. In this manner, it is possible to restrict useless processing load to be applied on the providing server 30 side and also inhibit needless increase of traffic between the servers.

Also, the above embodiment exemplifies the adaptation in which the providing server 30 authenticates the user based on the password and the identification information (S510-S540 of FIG. 7). However, information other than the password and the identification information may be used upon user authentication. As a particular example, header information (IP address, MAC address, for example) of the data requested from the client terminal 40 as the access source may be registered as a part of the registration information (S140 of FIG. 2). The user may be authenticated by the header information, or by the header information and authentication information.

(3) Correspondence Relation to the Present Invention

In the above explained embodiment, the area of the two-dimensional code 200 in an image corresponds to the storage destination specifying area of the present invention.

Also, S210 of FIG. 4 corresponds to the image acquiring device of the present invention. The shooting information added to image data in S230 of the same figure corresponds to the place information and time information of the present invention.

S260 of FIG. 5 corresponds to the data transmitting device of the present invention.

S340 of FIG. 6 corresponds to the area extracting device of the present invention. S400 of the same figure corresponds to the storage destination specifying device of the present invention. S410 of the same figure corresponds to the data storing device of the present invention.

S570 and S600 of FIG. 7 correspond to the data providing device of the present invention. S560 of the same figure corresponds to the first page generating device and the second page generating device of the present invention.

The invention claimed is:

1. A data providing system comprising:
   an image acquiring device that acquires image data representing a predetermined image;
   an area extracting device that extracts a storage destination specifying area which is an image area contained in the image represented by the image data and which indicates information for specifying a storage destination of the image data, based on the image data acquired by the image acquiring device;
   a storage destination specifying device that specifies the storage destination of the image data acquired by the image acquiring device, based on the storage destination specifying area extracted by the area extracting device;
   a data storing device that stores the image data acquired by the image acquiring device in the storage destination specified by the storage destination specifying device; and
   a data providing device that, upon receipt of a request for the image data stored in the specified storage destination by the data storing device from a client terminal capable of communicating data via a network, provides to the client terminal the image data respectively stored in the specified storage destination, wherein,
   for each image data acquired by the image acquiring device, a storage destination specifying area is extracted by the area extracting device, a storage destination is specified by a storage destination specifying device, and the image data is stored at the storage destination by the data storing device,
   the area extracting device, in case that the image represented by the image data acquired by the image acquiring device contains an image area having predetermined characteristics as characteristics to be possessed by the storage destination specifying area, extracts the image area as the storage destination specifying area.

2. The data providing system according to claim 1, wherein
   in case that a different storage destination is preassociated with each of the client terminals or each of the users of the client terminals,
   the data providing device, when receiving identification information which permits identification of the client terminal or a user of the client terminal from the client terminal as a request for the image data, provides to the client terminal the respective image data stored at the storage destination associated with the client terminal or the user of the client terminal identified by the identification information.

3. The data providing system according to one of claim 1, wherein
   the data acquiring device is capable of acquiring image data representing images at different places,
   the image data storing device stores the image data acquired by the image acquiring device at the storage destination specified by the storage destination specifying device together with place information which corresponds to information concerning a place of the image represented by the image data,
   the data providing device, when a request for the image data stored at the specified storage destination is received from the client terminal, provides to the client terminal the image data stored at the specified storage destination in a state capable of specifying the place information stored together with the image data.

4. The data providing system according to claim 3, comprising a first page generating device that generates a web page which displays a list of images represented by the image data stored at the storage destination, per storage destination at which the image data is stored by the data storing device, in a manner capable of specifying the place information which is stored together with the image data and in an order determined based on the place information, and the data providing device, when receiving a request for the image data stored at the specified storage destination from the client terminal, provides to the client terminal the web page which displays a list of images represented by the image data stored at the specified storage destination among the web pages generated by the first page generating device.

5. The data providing system according to claim 1, wherein the data storing device stores the image data acquired by the image acquiring device at the storage destination specified by the storage destination specifying device together with time information including date or time when the image data has been acquired, and the data providing device, when receiving a request for the image data stored at the specified storage destination from the client terminal, provides to the client terminal the image data respectively stored at the specified storage destination in a state capable of specifying a priority order based on the time information stored together with the image data.

6. The data providing system according to claim 4, comprising a second page generating device that generates a web page which displays a list of images represented by the image data stored at the storage destination, per storage destination at which the image data is stored by the data storing device, in a manner capable of specifying the time information which is stored together with the image data and in an order of date or time indicated by the time information, and the data providing device, when receiving a request for the image data stored at the specified storage destination from the client terminal, provides to the client terminal the web page which displays a list of images represented by the image data stored at the specified storage destination among the web pages generated by the second page generating device.

7. The data providing system according to claim 1, comprising:

a management server provided at least with the image acquiring device; and a providing server provided at least with the data storing device and the data providing device, wherein the management server and the providing server are connected with each other in a manner capable of communicating data, the management server includes a data transmission device that transmits image data acquired by the data acquiring device to the providing server, and, the providing server is adapted to store the image data received from the management server at a storage destination specified by the image data through the data storing device.

8. The data providing system according to claim 7, wherein the providing server is further provided with the area extracting device and the storage destination specifying device, and is adapted to extract the storage destination specifying area through the area extracting device, specify the storage destination through the storage destination specifying device, and store the image data at the storage destination through the data storing device, for each image data received from the management server.

9. The data providing system according to claim 8, wherein the management server includes an area determining device that determines whether the image represented by the image data acquired by the image acquiring device contains an image area having predetermined characteristics as characteristics to be possessed by the storage destination specifying area, and the data transmission device transmits to the providing server only the image data determined to contain the image area having the characteristics by the area determining device.

10. The data providing system according to claim 7, wherein the management server further includes the area extracting device, and the storage destination specifying devices, and is adapted to transmit to the providing server the image data of which storage destination is specified by the storage destination specifying device in a state capable of specifying the storage destination.

11. The data providing system according to claim 7, wherein each device of the management server is incorporated into a single server.

12. The data providing system according to claim 7, wherein each device of the providing server is incorporated into a single server.

13. A non-transitory computer readable medium having a program stored thereon for use in a data providing system, the program comprising the steps of:

acquiring image data representing a predetermined image;

extracting a storage destination specifying area which is an image area contained in the image represented by the image data and which indicates information for specifying a storage destination of the image data, based on the acquired image data;

specifying the storage destination of the acquired image data, based on the extracted storage destination specifying area;

storing the acquired image data in the specified storage destination; and, upon receipt of a request for the image data stored in the specified storage destination from a client terminal capable of communicating data via a network, provides to the client terminal the image data respectively stored in the specified storage destination, wherein, in case that the image represented by the image data acquired contains an image area having predetermined characteristics as characteristics to be possessed by the storage destination specifying area, extracting the image area as the storage destination specifying area.

* * * * *